United States Patent
Chelba et al.

(10) Patent No.: US 7,634,407 B2
(45) Date of Patent: Dec. 15, 2009

(54) METHOD AND APPARATUS FOR INDEXING SPEECH

(75) Inventors: Ciprian I. Chelba, Seattle, WA (US); Alejandro Acero, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 936 days.

(21) Appl. No.: 11/133,515

(22) Filed: May 20, 2005

(65) Prior Publication Data

US 2006/0265222 A1    Nov. 23, 2006

(51) Int. Cl.
*G10L 15/00* (2006.01)
(52) U.S. Cl. ............... 704/251; 704/254; 704/275; 369/25.01; 369/27
(58) Field of Classification Search ........... 704/251, 704/254, 275; 369/25.01, 27
See application file for complete search history.

(56) References Cited

U.S. PATENT DOCUMENTS

| | | | | |
|---|---|---|---|---|
| 4,783,803 | A | 11/1988 | Baker et al. ............ | 704/252 |
| 4,977,598 | A | 12/1990 | Doddington et al. ...... | 704/255 |
| 5,745,899 | A | 4/1998 | Burrows ............... | 707/102 |
| 6,047,283 | A | 4/2000 | Braun ................. | 707/3 |
| 6,185,527 | B1 * | 2/2001 | Petkovic et al. ........ | 704/231 |
| 6,266,658 | B1 | 7/2001 | Adya et al. ............ | 707/2 |
| 6,345,253 | B1 * | 2/2002 | Viswanathan ........... | 704/272 |
| 6,374,220 | B1 | 4/2002 | Kao ................... | 704/255 |
| 6,584,458 | B1 * | 6/2003 | Millett et al. .......... | 707/3 |
| 6,611,803 | B1 | 8/2003 | Furuyama et al. ....... | 704/254 |
| 6,873,993 | B2 | 3/2005 | Charlesworth et al. .... | 707/102 |
| 6,907,397 | B2 * | 6/2005 | Kryze et al. ........... | 704/251 |
| 7,092,883 | B1 | 8/2006 | Gretter et al. .......... | 704/242 |
| 7,216,077 | B1 | 5/2007 | Padmanabhan et al. .... | 704/240 |
| 7,266,553 | B1 * | 9/2007 | Anderson et al. ........ | 707/5 |
| 7,313,554 | B2 | 12/2007 | Chen et al. ............ | 707/3 |
| 7,379,870 | B1 | 5/2008 | Belvin et al. ........... | 704/255 |
| 2002/0052870 | A1 | 5/2002 | Charlesworth et al. .... | 707/3 |
| 2002/0184196 | A1 | 12/2002 | Lehmeier et al. ........ | 707/3 |
| 2003/0055634 | A1 | 3/2003 | Hidaka et al. .......... | 704/222 |
| 2003/0187643 | A1 | 10/2003 | Van Thong et al. ...... | 704/254 |
| 2003/0187649 | A1 * | 10/2003 | Logan et al. ........... | 704/260 |
| 2004/0044952 | A1 | 3/2004 | Jiang et al. ............ | 715/500 |
| 2004/0199385 | A1 | 10/2004 | Deligne et al. ......... | 704/235 |

(Continued)

FOREIGN PATENT DOCUMENTS

EP    1 043 665 A2    10/2000

(Continued)

OTHER PUBLICATIONS

Kenneth Ward Church, "Speech and Language Processing: Where have we been and where are we going?," in *Proceedings of Eurospeech*, Geneva, Switzerland, 2003.

(Continued)

*Primary Examiner*—Daniel D Abebe
(74) *Attorney, Agent, or Firm*—Theodore M. Magee; Westman, Champlin & Kelly, P.A.

(57) ABSTRACT

A method of indexing a speech segment includes identifying at least two alternative word sequences based on the speech segment. For each word in the alternative sequences, information is placed in an entry for the word in the index. The information indicates the position of the word in at least one of the alternative sequences.

8 Claims, 7 Drawing Sheets

U.S. PATENT DOCUMENTS

| | | | |
|---|---|---|---|
| 2005/0060139 A1* | 3/2005 | Corston-Oliver et al. | 704/1 |
| 2005/0159953 A1 | 7/2005 | Seide et al. | 704/254 |
| 2005/0228671 A1* | 10/2005 | Olorenshaw et al. | 704/260 |
| 2007/0106509 A1 | 5/2007 | Acero et al. | 704/240 |
| 2007/0106512 A1 | 5/2007 | Acero et al. | 704/260 |
| 2007/0143110 A1 | 6/2007 | Acero et al. | 704/251 |

FOREIGN PATENT DOCUMENTS

| | | |
|---|---|---|
| WO | WO 00/54168 A2 | 9/2000 |
| WO | WO 02/27546 A2 | 4/2002 |

OTHER PUBLICATIONS

J. Garofolo, G. Auzanne, and E. Voorhees, "The TREC spoken document retrieval track: A success story," in *Proceedings of the Recherche d'Informations Assiste par Ordinateur: ContentBased Multimedia Information Access Conference*, Apr. 2000.

M. G. Brown, J. T. Foote, G. J. F. Jones, K. Sparck Jones, and S. J. Young, "Open-vocabulary speech indexing for voice and video mail retrieval," in *Proc. ACM Multimedia 96*, Boston, Nov. 1996.

David Anthony James, "The Application of Classical Information Retrieval Techniques to Spoken Documents," Ph.D. thesis, University of Cambridge, Downing College, 1995.

Ciprian Chelba and Alex Acero, "Position specific posterior lattices for indexing speech," in *Proceedings of ACL*, Ann Arbor, Michigan, Jun. 2005.

Sergey Brin and Lawrence Page, "The anatomy of a large-scale hypertextual web search engine," *Computer Networks and ISDN Systems*, vol. 30, No. 1-7, pp. 107-117, 1998.

L. R. Rabiner, "A tutorial on hidden markov models and selected applications in speech recognition," in *Proceedings IEEE*, 1989, vol. 77(2), pp. 257-285.

James Glass, T. J. Hazen, Lee Hetherington, and Chao Wang, "Analysis and processing of lecture audio data: Preliminary investigations," in *HLT-NAACL 2004 Workshop: Interdisciplinary Approaches to Speech Indexing and Retrieval*, Boston, Massachusetts, May 2004, pp. 9-12.

Aubert, X. L. "Fast Look-ahead Pruning Strategies in Continuous Speech Recognition." Proc. ICASSP-89. 1989. 659-662.

Sergey Brin and Lawrence Page. 1998. The anatomy of a large-scale hypertextual Web search engine. *Computer Networks and ISDN Systems*, 30(1-7):107-117.

M.G. Brown, J.T. Foote, G.J.F. Jones, K. Spärck Jones, and S.J. Young. 1996. Open-vocabulary speech indexing for voice and video mail retrieval. In *Proc. ACM Multimedia 96*, pp. 307-316, Boston, November.

Kenneth Ward Church. 2003. Speech and language processing: Where have we been and where are we going? In *Proceedings of Eurospeech*, Geneva, Switzerland.

J. Garofolo, G. Auzanne, and E. Vorrhees. 2000. The TREC spoken document retrieval track: A success story. In *Proceedings of the Recherche d'Informations Assiste par Ordinateur: ContentBased Multimedia Information Access Conference*, April.

James Glass, Timothy J. Hazen, Lee Hetherington, and Chao Wang. 2004. Analysis and processing of lecture audio data: Preliminary investigations. In *HLT-NAACL 2004 Workshop: Interdisciplinary Approaches to Speech Indexing and Retrieval*, pp. 9-12, Boston, Massachusetts, USA, May 6.

David Anthony James. 1995. *The Application of Classical Information Retrieval Techniques to Spoken Documents*. Ph.D. thesis, University of Cambridge, Downing College.

B. Logan, P. Moreno, and O. Deshmukh. 2002. Word and sub-word indexing approaches for reducing the effects of OOV queries on spoken audio. In *Proc. HLT*.

Kenney Ng. 2000. *Subword-Based Approaches for Spoken Document Retrieval*. Ph.D. thesis, Massachusetts Institute of Technology.

L.R. Rabiner. 1989. A tutuorial on hidden markov models and selected applications in speech recognition. In *Proceedings IEEE*, vol. 77(2), pp. 257-285.

Murat Saraclar and Richard Sproat. 2004. Lattic-based search for spoken utterance retrieval. In *HLT-NAACL 2004: Main Proceedings*, pp. 129-136, Boston, Massachusetts, USA, May 2-May 7.

F. Seide and P. Yu. 2004a. A hybrid word/phonemebased approach for improved vocabulary-independent search in spontaneous speech. In *Proceedings of IC-SLP*, Jeju, Korea.

F. Seide and P. Yu. 2004b. Vocabulary-independent search in spontaneous speech. In *Proceedings of ICASSP*, Montreal, Canada.

Matthew A. Siegler. 1999. *Integration of Continuous Speech Recognition and Information Retrieval for Mutually Optimal Performance*. Ph.D. thesis, Carnegie Mellon University.

P.C. Woodland, S.E. Johnson, P. Jourlin and K. Spärck Jones. 2000. Effects of out of vocabulary words in spoken document retrieval. In *Proceedings of SIGIR*, pp. 372-374, Athens, Greece.

Ljolje, A., Pereira, F. & Riley, M. (1999). Efficient General Lattice Generation and Rescoring. In Proceedings of the $6^{th}$ European Conference on Speech Communications and Technology, vol. 3 pp. 1251-1254, Budapest.

Chelba et al., C. "Speech OGLE: Indexing Uncertainty for Spoken Document Search", Proceedings of the ACL Interactive Poster and Demonstration Sessions, pp. 41-44, Ann Arbor, Jun. 2005.

Mangu et al., L., "Finding consensus in speech recognition: word error minimization and other applications of confusion networks", Computer Speech and Language vol. 14, No. 4, Oct. 7, 2000.

MSN Search, "Index Serving Core", design specification, 2004.

International Search Report and Written Opinion of the International Searching Authority for Application No. PCT/US2006/042723 filed Oct. 31, 2006. Date of Mailing: Mar. 30, 2007.

Douglas Oard, Bhuvana Ramabhadran, and Samuel Gustman (2004). Building an Information Retrieval Test Collection for Spontaneous Conversational Speech. In Proceedings of SIGIR 2004.

J. P. A. Charles and P. N. Garner, "Spoken content metadata and MPEG-7," in Proc. ACM MM2000 Workshops, 2000, pp. 81-84.

J. V. Thong, P. J. Moreno, B. Logan, B. Fidler, K. Maffey, and M. Moores, SPEECHBOT: An Experimental Speech-Based Search Engine for Multimedia Content in the Web: Compaq Cambridge Res. Lab. Tech. Rep., CRL Jun. 2001.

Dharanipragada, S., and Roukos, S. A Fast vocabulary independent algorithm for spoiling words in speech. In Proceedings of ICASSP 98, 1998.

Huang, X., Acero, A. Alleva, F., Hwang, M., Jiang, L. and Mahajan, M. Microsoft Windows Highly Intelligent Speech Recognizer: Whisper. In IEEE International Conference on Acoustics, Speech, and Signal Processing, May 1995, vol. 1, pp. 93-96.

\* cited by examiner

$n_1[0] = <s>$ $n_2[1] = $ They $n_3[2] = $ are $n_4[0] = <s>$ $n_5[1] = $ There $n_6[2] = $ in — 600

$n_6[3] = $ in — 602

$n_7[3] = $ two $n_7[4] = $ two $n_8[3] = $ into $n_9[4] = $ very $n_9[5] = $ very — 604

$n_{10}[5] = $ very — 606

$n_{10}[6] = $ very $n_{11}[6] = $ big $n_{11}[7] = $ big $n_{12}[7] = $ houses $n_{12}[8] = $ houses $n_{13}[8] = <e>$ $n_{13}[9] = <e>$

FIG. 6

| POSITION BIN | 0 | 1 | 2 | 3 | 4 | 5 | 6 | 7 | 8 | 9 |
|---|---|---|---|---|---|---|---|---|---|---|
|  | <s> | They There | are in | in into two | very two | very | very big | big houses | houses <e> | <e> |

802 — document_id[1], segment_id[1], position[1], probability[1]

804 — document_id[1], segment_id[1], position[2], probability[2]

⋮

806 — document_id[1], segment_id[1], position[n], probability[n]

808 — document_id[1], segment_id[2], position[1], probability[1]

document_id[1], segment_id[2], position[2], probability[2]

⋮

810 — document_id[1], segment_id[2], position[n], probability[n]

812 — document_id[2], segment_id[1], position[n], probability[n]

⋮

814 — document_id[T], segment_id[v], position[v], probability[v]

FIG. 8

METHOD AND APPARATUS FOR INDEXING SPEECH

BACKGROUND OF THE INVENTION

The present invention relates to the generation of an index. In particular, the present invention relates to producing an index for speech.

Searching through vast collections of documents for a particular document of interest has become commonplace in computing environments. In particular, searches performed on web pages found on the Internet are performed by a large number of search services.

To perform these text-based searches, search services typically construct an inverted index that has a separate entry for each word found in the documents covered by the search service. Each entry lists all of the documents and the positions within the documents where the word can be found. Many of these search services use the position information to determine if a document contains words in a particular order and/or within a particular distance of each other. This order and distance information can then be used to rank the documents based on an input query with documents that have the words of the query in the same order as the query being ranked higher than other documents. Without the position information, such document ranking based on word order is not possible.

Attempts have been made to construct indices for spoken documents, where a spoken document is a speech signal or multiple speech signals that have been grouped together as a single entity. For example, speech signals associated with a particular meeting or a lecture could be grouped as a single spoken document. Also, a multimedia document such as a movie or an animation can be considered a spoken document.

In order to index a spoken document, the speech signals must first be converted into text. This is done by decoding the speech signal using a speech recognition system. Such speech recognition systems use acoustic models and language models to score possible word sequences that could be represented by the speech signal. In many systems, a lattice of possible word strings is constructed based on the speech signal and the path through the lattice that has the highest score is identified as the single word string represented by the speech signal.

In speech indexing systems of the past, this single best estimate of the text from the speech signal is used to create the index for the spoken document. Using a single string output from the speech recognizer provides the ability to mark the position of particular words relative to each other in the spoken document. Thus, the same ranking systems that have been developed for textual indexing can be applied to these spoken document indexing systems.

Unfortunately, speech recognition is not perfect. As a result, the recognized text contains errors. This produces an index with errors, making the systems unreliable during search.

Thus it is desirable to build a speech indexing system that does not suffer from errors created by selecting a best speech recognition result.

SUMMARY OF THE INVENTION

A method of indexing a speech segment includes identifying at least two alternative word sequences based on the speech segment. For each word in the alternative sequences, information is placed in an entry for the word in the index. The information indicates the position of the word in at least one of the alternative sequences.

DETAILED DESCRIPTION OF ILLUSTRATIVE EMBODIMENTS

Figure 1:
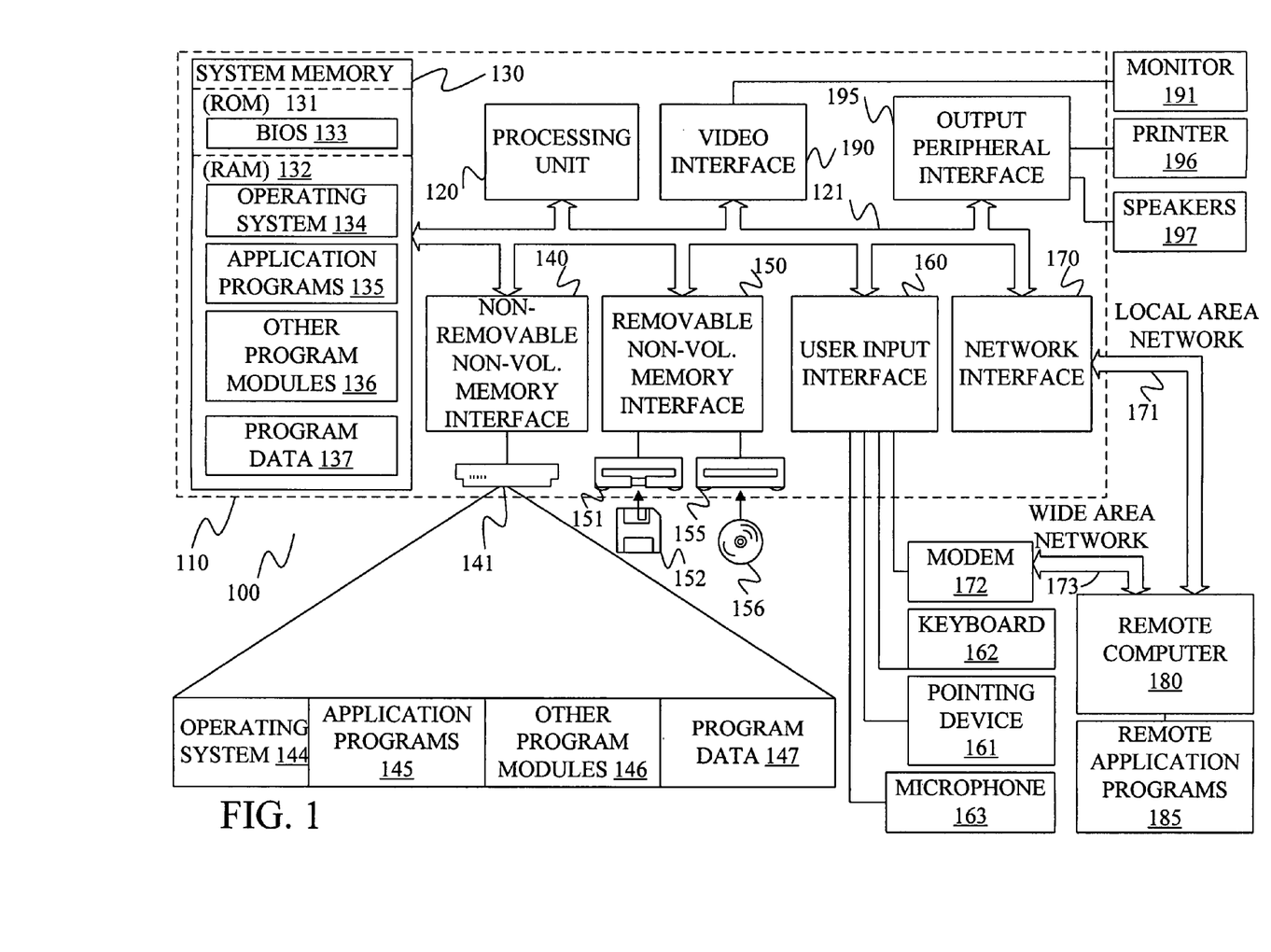
FIG. 1 is a block diagram of one computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
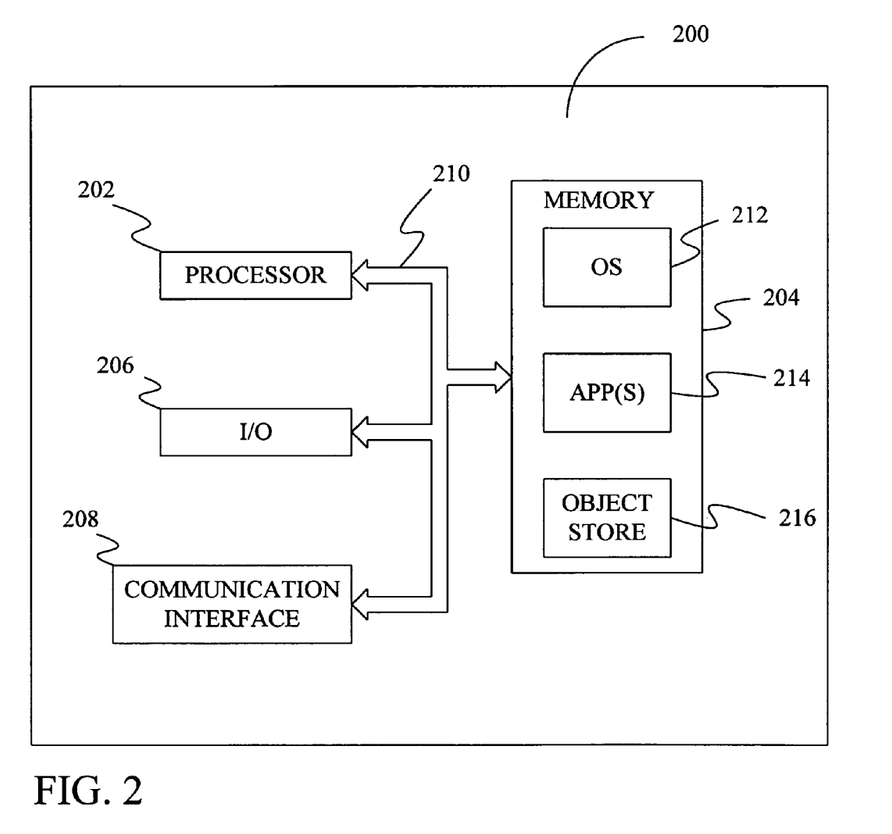
FIG. 2 is a block diagram of an alternative computing environment in which the present invention may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

Figure 3:
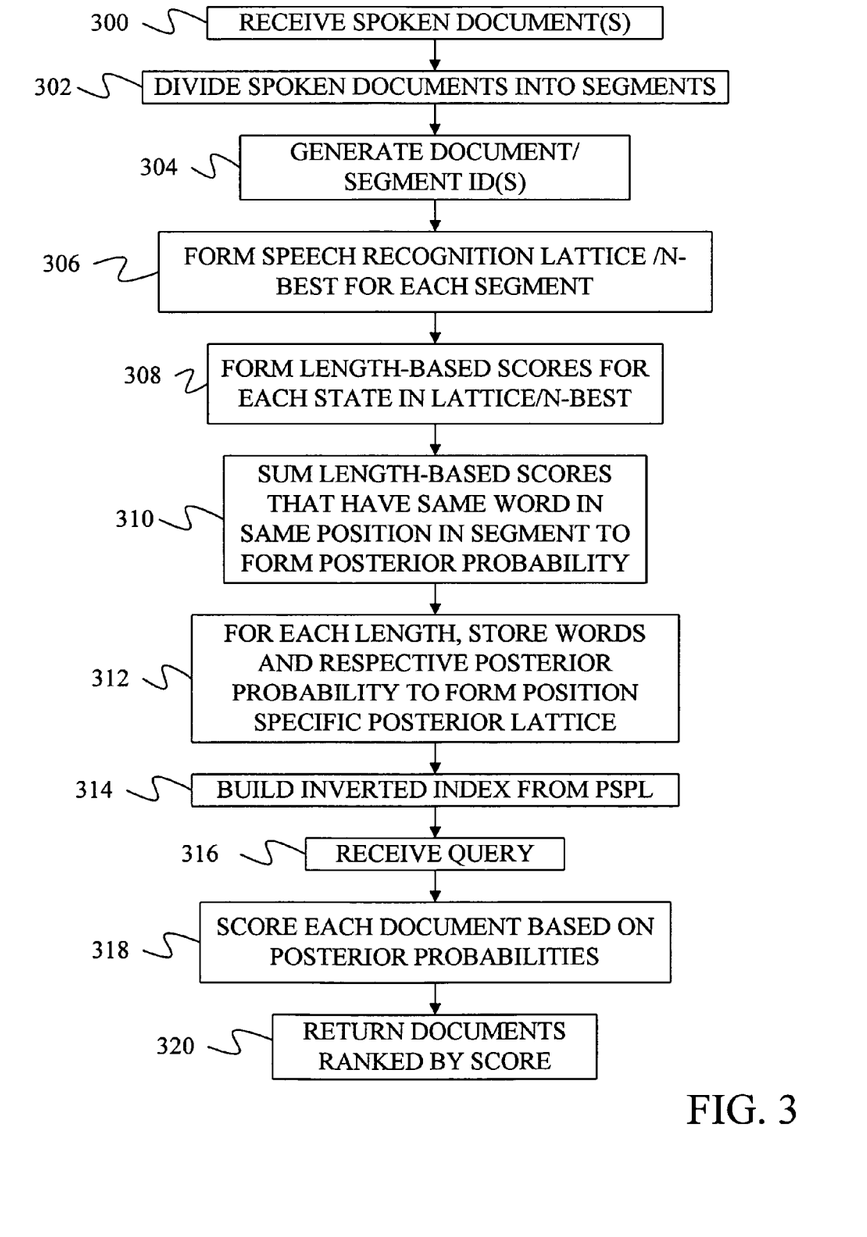
FIG. 3 is a flow diagram of a method of constructing and searching an index under embodiments of the present invention.
Figure 4:
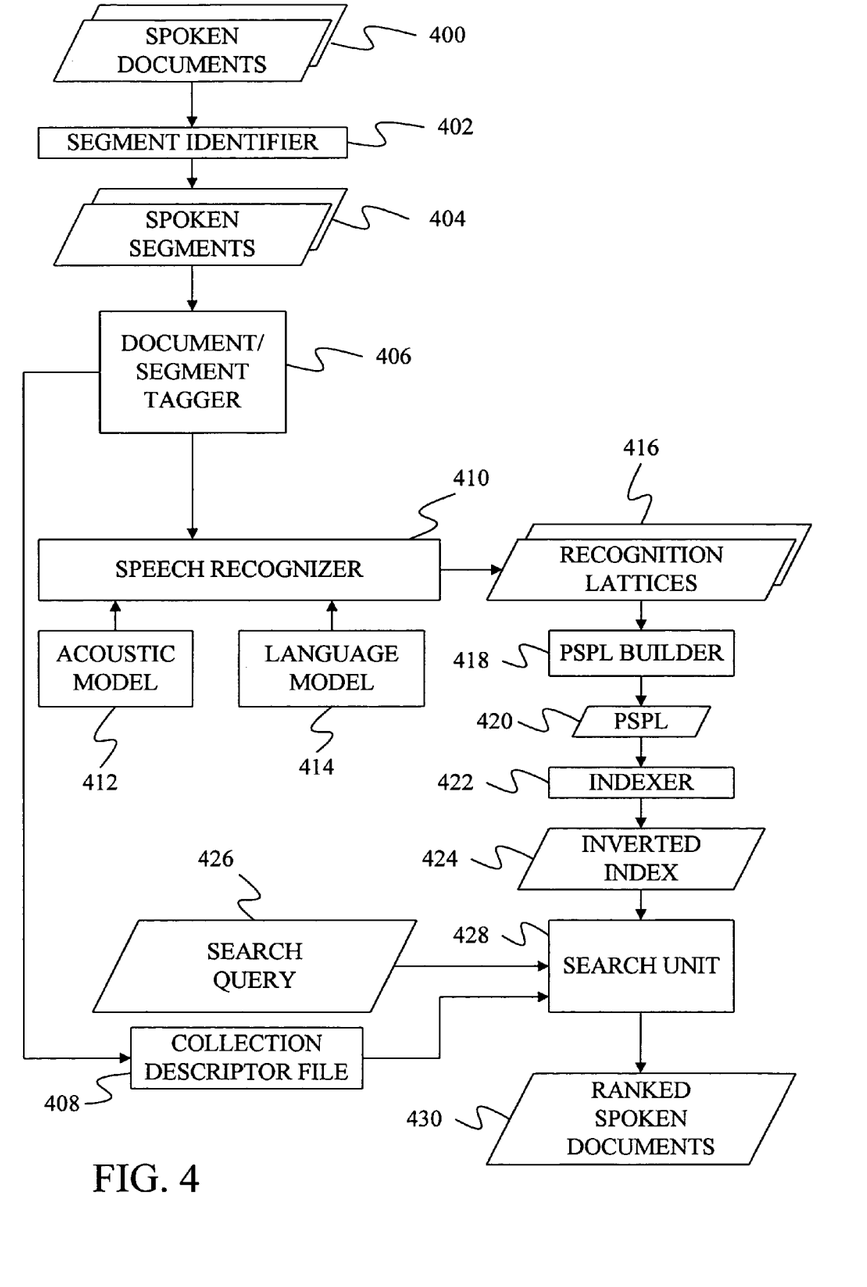
FIG. 4 is a block diagram of elements used in constructing and searching an index under embodiments of the present invention.

FIGS. 3 and 4 provide a method and a block diagram, respectively, for forming and using an index of spoken documents under an embodiment of the present invention. In step 300 of FIG. 3, spoken documents 400 are received. These spoken documents may be stored so that all of the documents can be processed at the same time or individual documents may be received and processed separately. In other embodiments, each document is received in a streaming manner and is indexed without having to store the spoken document.

In general, a spoken document is a collection of speech signals that are related to each other in some manner. For example, speech signals that occur at a meeting, speech signals associated with a lecture, or speech signals associated with a multimedia document such as a movie or a multimedia presentation. To form spoken documents 400, some embodiments of the present invention separate the speech content from other content in a multimedia document. For example, the speech content may be removed from a movie to separate it from the video and musical content of the movie. When the spoken document represents only the speech content of a multimedia document, a mapping may be stored that links the spoken document to the multimedia document. This allows a path to the multimedia document to be returned in the search results.

Spoken documents can be very long. To assist in the speech recognition process, each spoken document is divided into spoken segments 404 by a segment identifier 402 at step 302. A spoken document then consists of an ordered list of segments. Under one embodiment, the segments are formed by dividing each spoken document at periods of silence. Techniques for identifying periods of silence in speech are well known in the art.

At step 304, a document/segment tagger 406 maps each segment and each spoken document to an integer value and stores the mapping in a collection descriptor file 408, which lists all documents and segments. In some embodiments, collection descriptor file 408 maps the integer value to a path name where the spoken document can be found. For spoken documents that were generated from multimedia files, collection descriptor file 408 can map the integer value to a path name where the multimedia document is stored.

In some embodiments, a single integer value is used to identify both the segment and the document. In such cases, the range of such values that are associated with each document must also be stored. In other embodiments, each document has a unique integer value and each segment within a document has a unique integer value as its identifier within the document. The integer values provide a compact reference to the documents/segments that can be efficiently stored in the index.

Each of the spoken segments 404 is provided to a speech recognizer 410, which uses an acoustic model 412 and a language model 414 to decode the spoken segments into possible text sequences at step 306 of FIG. 3.

Typically, speech recognizer 410 performs the recognition based on a sequence of feature vectors that represent the speech in the spoken segments.

The feature vectors used by the speech recognizer are formed by first converting an analog speech signal into digital values using an analog-to-digital converter. In several embodiments, the analog-to-digital converter samples the analog signal at 16 kHz and 16 bits per sample, thereby creating 32 kilobytes of speech data per second. These digital values are provided to a frame constructor, which, in one embodiment, groups the values into 25 millisecond frames that start 10 milliseconds apart. The frames of data created by the frame constructor are provided to a feature extractor, which extracts a feature from each frame.

Examples of feature extraction modules include modules for performing Linear Predictive Coding (LPC), LPC derived cepstrum, Perceptive Linear Prediction (PLP), Auditory model feature extraction, and Mel-Frequency Cepstrum Coefficients (MFCC) feature extraction. Note that the invention is not limited to these feature extraction modules and that other modules may be used within the context of the present invention.

The steps needed to form the feature vectors can be performed entirely by speech recognizer 410, or some or all of the steps may be performed when generating spoken documents 400. Thus, spoken documents 400 may be stored as analog signals, digital signals, frames of digital signals, or feature vectors.

During recognition, each feature vector is applied to acoustic model 412, which provides a probability of each of a set of phonetic units given an input feature vector. The acoustic probability of a word is determined by combining the probabilities of the phonetic units that form the word. In addition, each word receives a language model score that indicates the probability of a word or a sequence of words appearing in a particular language. Using the scores provided by acoustic model 412 and language model 414, speech recognizer 410 is able to form a recognition lattice 416 that contains recognition results for a speech segment. Note that in most embodiments, speech recognizer 416 prunes unlikely word sequences from lattice 416 as it constructs the lattice, leaving only the top N recognition results in the lattice. In other embodiments, speech recognizer 410 produces an n-best list of recognition results that provides a list of the n most likely word sequences given the speech segment.

Note that although the system above segments the documents before providing the segments to speech recognizer 410, in other embodiments, spoken documents 400 are not segmented before being provided to speech recognizer 410. Instead, speech recognizer identifies periods of silence in the speech and at such points forces the lattice to converge to a single node before beginning a new lattice for the next portion of the spoken document. In this manner, speech recognizer 410 generates a separate recognition lattice for different segments of the spoken document. In such embodiments, speech recognizer 410 will include a document and segment identifier for each recognition lattice that it produces and will update the mapping in collection descriptor file 408.

Figure 5:
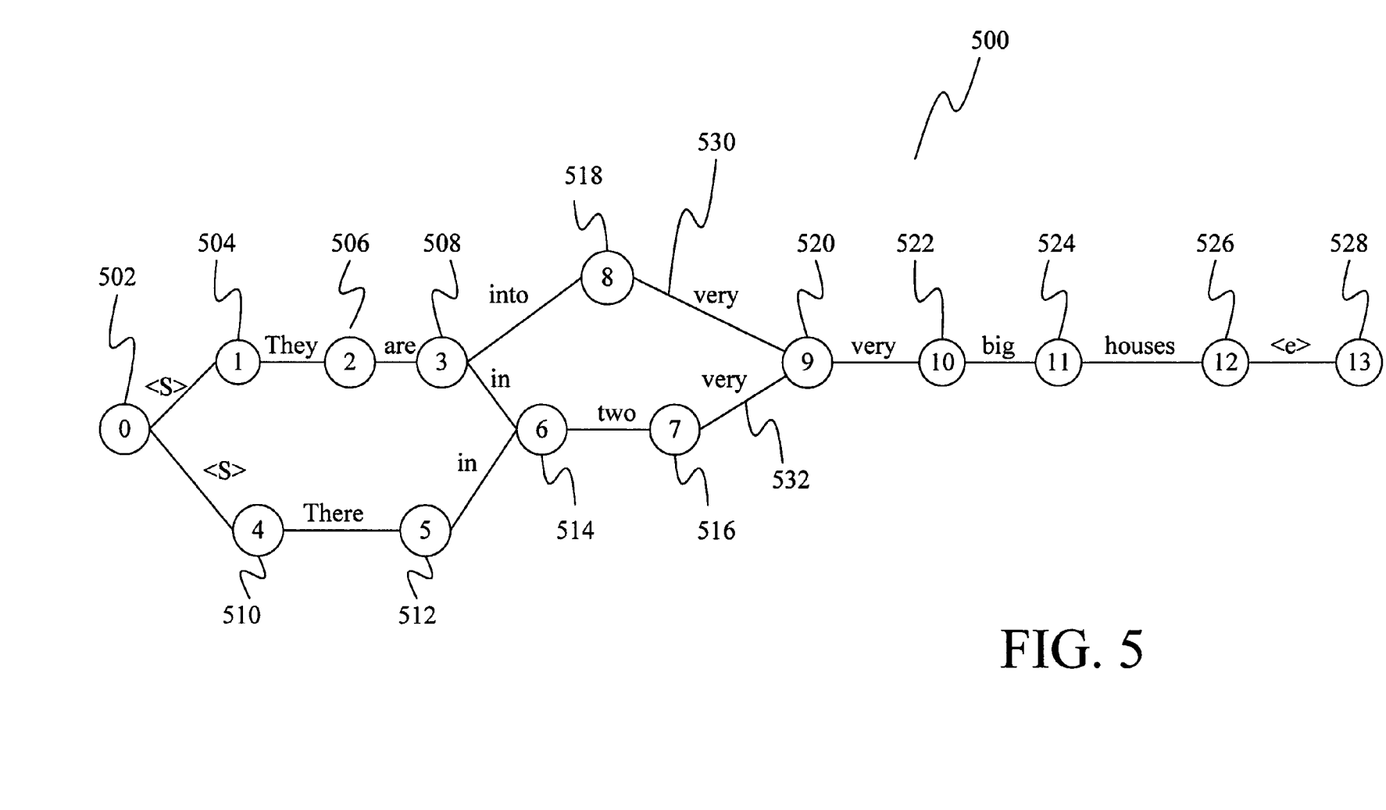
FIG. 5 is an example of a recognition lattice.

FIG. 5 provides an example of a recognition lattice 500 produced by speech recognizer 410. Lattice 500 includes states (also referred to as nodes) 502, 504, 506, 508, 510, 512, 514, 516, 518, 520, 522, 524, 526 and 528 which are labeled as states 0, 1, 2, 3, 4, 5, 6, 7, 8, 9, 10, 11, 12 and 13, respectively.

Every transition between states in lattice 500 is associated with a word, a start symbol or an end symbol. In addition, for language models that are based on sequences of multiple words (n-gram models where n is greater than 1), every transition into a state must contain the same word. For example, transitions 530 and 532 into state 520 both contain the word "very". Because of this, the word on a transition can equally be associated with the ending state of the transition.

Each transition also has an associated probability for the word located on the transition given the input speech signal. This probability is a function of an acoustic model score, a language model score, and various other parameters used to combine and modify those scores into a single probability. In particular, under one embodiment of the present invention, the probability of a transition $t_i$ is stored as a log probability that is evaluated as:

$$\log P(t_i) = FLATw\left[\frac{\log P_{AM}(t_i)}{LMw} + \log P_{LM}(\text{word}(t_i)) - \frac{\log P_{IP}}{LMw}\right] \quad \text{EQ. 1}$$

Where log $P(t_i)$ is the log probability for transition $t_i$, log $P_{AM}(t_i)$ is an acoustic model log likelihood assigned to the word of transition $t_i$ based on the correspondence between the feature vectors of a portion of the speech signal and the acoustic models of the phonetic units found in the word, log $P_{LM}(\text{word}(t_i))$ is the language model log probability assigned to the word on transition $t_i$, LMw is a constant weight, larger than 0, which compensates for difference in the range of possible values for the acoustic model and the language model, log $P_{IP}$ is an insertion penalty, which compensates for the speech recognizer's tendency to select short words over longer words, and FLATw is a flattening weight used to control how skewed the posterior distribution becomes on the lattice paths. In particular, FLATw helps to keep the speech recognizer from assigning most of the probability to one or two paths in the lattice.

Speech recognition lattice 500 of FIG. 5 shows that different path lengths can end at the same state. For example, there are two paths that reach state 514. One path includes the start symbol and the words "They are in" and the other path includes the start symbol and the words "There in". Thus, state 514, which represents the word "in", can be reached when "in" is in the second word position in the recognized text and when "in" is in the third word position in the recognized text, where word position is determined from the start of a word sequence. In addition, a single word may appear at different states but at the same word position in those states. For example, the word "very" enters state 520 on transition 532 in the fifth word position of the path "They are in two very". The word "very" is also in the fifth word position in the transition leading into state 522 along the path "There in two very very", where the last very is in the fifth word position.

Figure 7:
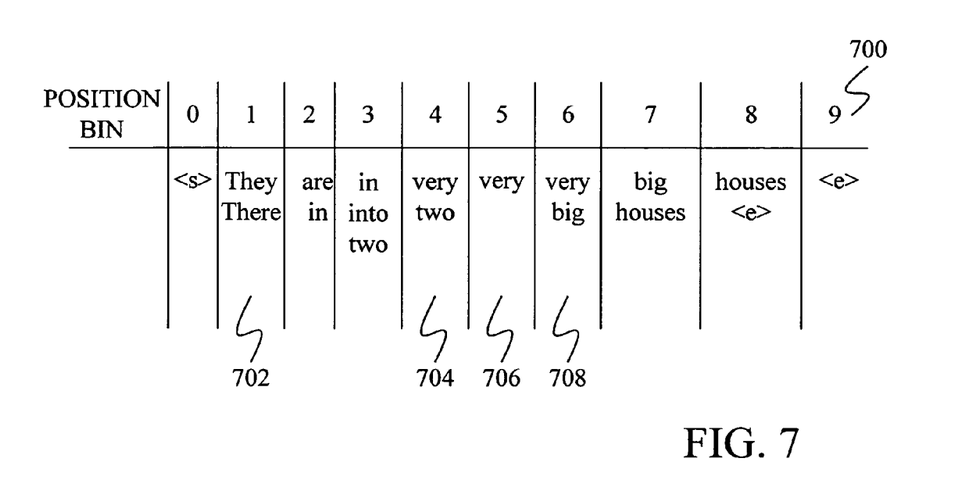
FIG. 7 is an example of a position specific posterior lattice.

In order to construct an index from this word lattice, a position specific posterior lattice (PSPL) 420 must be constructed. In the position specific posterior lattice, each word position in the lattice forms a bin. All words that occupy a particular word position are placed in the bin for that word position along with the probability of the word occupying that word position in the lattice. In order to form the position specific posterior lattice, each state is separated into a set of sub-states, with one sub-state for each word position that reaches the state.

Figure 6:
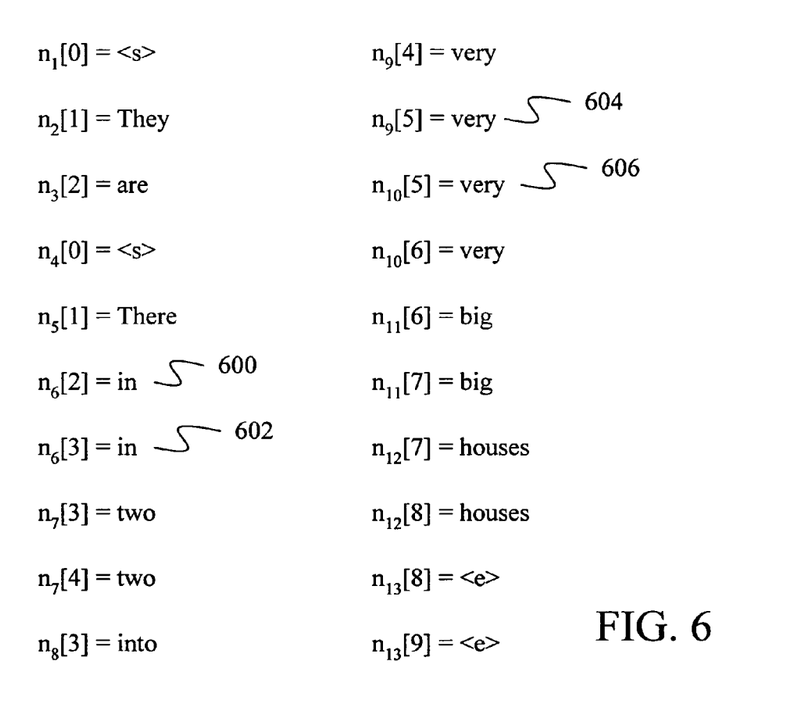
FIG. 6 shows the association between words and nodes that have been divided into positions.

FIG. 6 provides a listing of sub-states and their associated words that are formed form lattice 500 of FIG. 5. For example, sub-states 600 and 602 indicate that for state 6, there are two sub-states, one for the word "in" at position 2 and one for the word "in" at word position 3. Sub-states 604 and 606 indicate that the word "very" appears in word position 5 at both states 9 and 10.

A length-based or word position score is determined for each sub-state. This is shown at step 308 of FIG. 3 and is performed by position specific posterior lattice builder (PSPL Builder) 418 of FIG. 4.

Under one embodiment, the length-based scores at each state are calculated using a modification of the standard forward-backward algorithm used to score paths through a lattice. In particular, the probability of a word at a state n and a word position 1 can be calculated as:

$$P(n, l|LAT) = \frac{\alpha_n[l] \cdot \beta_n}{\text{norm}(LAT)} \quad \text{EQ. 2}$$

where $\alpha_n[l]$ is a forward score that is calculated recursively as:

$$\alpha_n[l] = \sum_{i=1}^{q} \alpha_{s_i}[l - 1 + \delta(\text{word}(t_i), \varepsilon)] \cdot \log P(t_i) \quad \text{EQ. 3}$$

where q is the number of states $S_i$ that transition into state n, log $P(t_i)$ is calculated using equation 1 above, $$\alpha_{start}[l] = \begin{cases} 1.0, & l = 0 \\ 0.0, & l \neq 0 \end{cases} \quad \text{EQ. 4}$$

and $$\delta(\text{word}(t_i), \varepsilon) = \begin{cases} 0 & \text{word}(t_i) \neq \varepsilon \\ 1 & \text{word}(t_i) = \varepsilon \end{cases} \quad \text{EQ. 5}$$

Where $\varepsilon$ represents a null transition that does not contain a word. Such null transitions are common in recognition lattices that utilize back-off language models. In EQ. 2, $\beta_n$ is calculated recursively as:

$$\beta_n = \sum_{j=1}^{r} \beta_{s_j} \cdot P[t_j] \quad \text{EQ. 6}$$

where r is the number of states connected to state n after state n and $P[t_j]$ is the probability associated with transitioning from state n to state $s_j$.

The normalizing value norm(LAT) of EQ. 2 is the value of $\alpha_n$ calculated at the end state of the speech recognition lattice. Note that the normalization is required because of the pruning performed during speech recognition.

After a length-based score has been determined for each observed word position at each state, the length-based scores are summed at step 310. In particular, each score that is for the same word position and for the same word is summed together to form a posterior probability that the word appears in the speech segment at that word position. This summation is expressed as:

$$P(w,l|LAT) = \Sigma_{n\ s.t. P(n,l) > 0} P(n,l|LAT) \cdot \delta(w, \text{word}(n)) \qquad \text{EQ. 7}$$

where the summation is performed across all states n in the lattice where the length-based score is greater than zero.

The words and their respective probabilities formed through the sum of EQ. 7 are then stored based on their word position, 1, to form position specific posterior lattice 420.

An example of a position specific posterior lattice is shown in FIG. 7 where the possible positions are shown in row 700 and the words that occur at each position are shown below their respective position. For example, the words "They" and "There" occur in word position 1 as indicated by column 702. The word "very" occurs in word positions 4, 5, and 6 as shown in columns 704, 706 and 708. Note that the position specific posterior lattice provides a more compact representation of the recognition results than the combination of lattice 500 and the sub-states of FIG. 6. The reason for this is that words that appear at the same word position but at different states in recognition lattice 500 are combined into a single entry in the position specific posterior lattice of FIG. 7.

In other embodiments, the position specific posterior lattice is constructed from an n-best list. The same technique described above can be used to construct the position specific posterior lattice by first forming a recognition lattice from the n-best list. This can be accomplished by tying the first word of each entry in the n-best list to a common start node, and the last word of each entry in the n-best list to a common end node.

At step 314, an indexer 422 builds an inverted index 424 based on the position specific posterior lattice. Under one embodiment, this inverted index is formed by providing an entry for every word in the recognition grammar. In each entry, information is provided for each position in the position specific posterior lattices where the entry's word appears. This information includes the document and segment identifier associated with the position specific posterior lattice, the position bin in which the word is placed in the lattice, and the probability associated with that word in that position.

Figure 8:
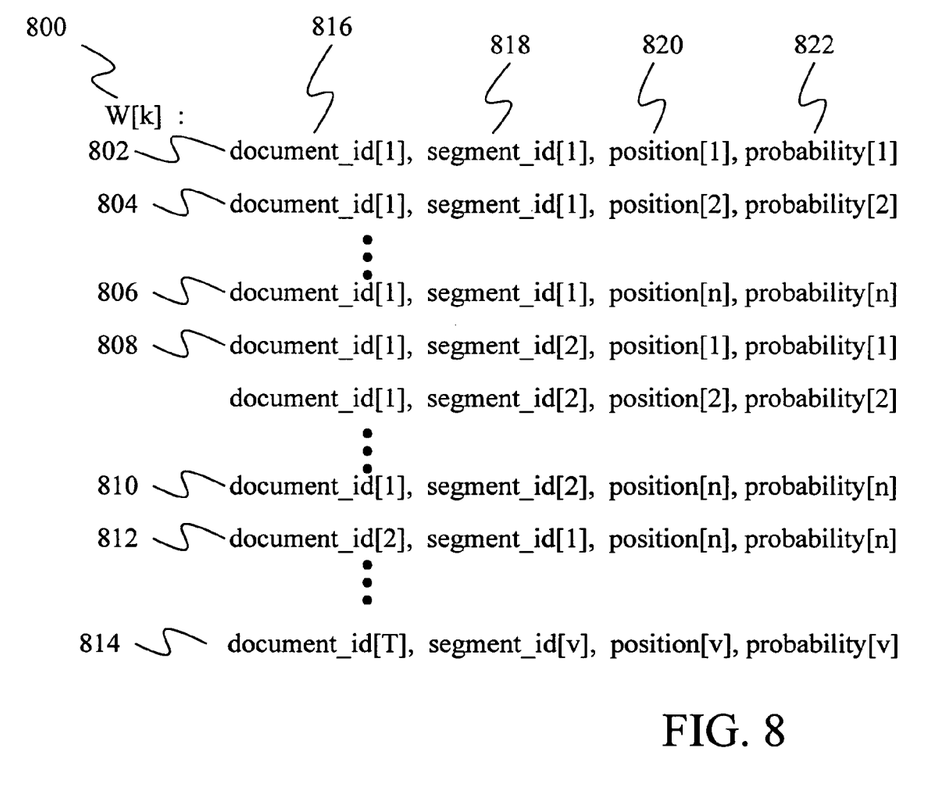
FIG. 8 is an example of a portion of an index formed under the present invention.

FIG. 8 provides a generic representation of an entry 800 for a word w[k]. In FIG. 8, entry 800 includes a collection of sub-entries including sub-entries 802, 804, 806, 808, 810, 812, and 814. Each sub-entry includes information such as a document identifier, such as document identifier 816, a segment identifier, such as segment identifier 818, a position in the segment such as position 820 and a probability of the word appearing in that position in the segment such as probability 822. Sub-entries 802, 804 and 806 are for the same document and segment. Sub-entries 808 and 810 are for the same document as sub-entries 802, 804, and 806, but are for a different segment. Sub-entries 812 and 814 are for separate documents. Entry 800 will include sub-entries for every document, segment and position where the word appears.

In some embodiments, each entry is stored as a separate file in order to allow easy incremental updates of the index.

Once the index has been constructed, a search may be performed to identify a spoken document based on a search query. In particular, at step 316, a search query 426 is received by a search unit 428. Search unit 428 accesses inverted index 424 and retrieves the document identifier, segment identifier, position, and probability of each sub-entry for each word of the query. Any words that are outside of the speech recognizer's vocabulary are mapped to an unknown token UKN, which cannot be matched in any document. The unknown token acts as a placeholder but does not provide a value in the calculation of a score for the query.

At step 318, a score is determined for each document that is returned from the search of inverted index 424. The documents that are returned from the search can be limited such that every document that is returned includes all of the words of the query. Alternatively, any document that contains at least one word of the query can be returned at this stage.

Using the probabilities returned from inverted index 424, the scores for each document are calculated by first calculating a collection of composite n-gram scores for each document. Each composite n-gram score is formed by summing individual n-gram scores over all possible formations of an n-gram in the query using:

$$S_{N-gram}(D, Q) = \sum_{i=1}^{K-N+1} S(D, q_i \ldots q_{i+N-1}) \qquad \text{EQ. 8}$$

where D is the document, K is the number of words in the query, N is the number words in the n-gram, Q is the query, and $S(D, q_i \ldots q_{i+N-1})$ is the score for a single n-gram beginning at point i in the query, which is calculated as:

$$S(D, q_i \ldots q_{i+N-1}) = \log\left[1 + \sum_s \sum_k \prod_{l=0}^{N-1} P(w_{k+l}(s) = q_{i+l}|D)\right] \qquad \text{EQ. 9}$$

where the inner summation on the right-hand side is performed over the first k−N word positions in a segment and the outer summation is performed across all segments associated with document D. In EQ. 9, $P(w_{k+l}(s)=q_{i+l}|D)$ is the posterior probability stored in the inverted index for the word at position k+l for document D and segment s.

If more than one composite n-gram score is calculated for each document, the separate composite n-gram scores are combined in a weighted sum using:

$$S(D, Q) = \sum_{N=1}^{K} w_N \cdot S_{N-gram}(D, Q) \qquad \text{EQ. 10}$$

Where $W_N$ is the weight associated with a particular N-gram and K is the number of words in the query.

In many embodiments, the weights of the n-grams increase linearly with the n-gram order. However, other techniques may be used to set the weights of the n-grams.

The scores calculated for each document are used to rank the documents that are to be returned. The documents that are returned may be pruned by removing documents that do not provide a non-zero score for the highest order composite n-gram. This ensures that all of the words of the query appear in order at least once in the document. This requirement enforces a quoted functionality, which requires all of the words present and in the same order as in the query in order for a document to be identified from the query. Another possibility is to allow quoting of phrases within the query, such as JAPAN "NUCLEAR WEAPONS"; entering such a query will return only documents that contain JAPAN and NUCLEAR and WEAPONS, and the words NUCLEAR WEAPONS occur exactly in this order next to each other.

At step 320, the documents identified and scored by search unit 428 are returned as ranked documents 430. In many embodiments, search unit 428 accesses collection descriptor file 408 to convert the document identifier into the path name of the location of the document. This path name is then returned.

In a further embodiment of the invention, morphological analysis is performed on the query before applying the query to the index. This generates a list of different forms of the query terms, including other endings for the word. For example, the term "weapons" in a query would produce the alternative "weapon" in which the final "s" has been dropped. Different combinations of the morphologically altered terms can then be used to perform different searches of the inverted index. Each search involves forming composite n-gram scores as above. The composite n-gram scores for the alternative search strings are weighted much less than the composite n-gram scores for the original search string. As a result, documents that contain an alternative search string but not the original search string will be ranked below documents that contain the original search string.

Although the indexing technique has been discussed above with reference to complete words, the same technique can be used to index any speech unit including sub-word units, such as phones or tri-phones. In particular, instead of forming a lattice of words, the speech recognizer forms lattices of sub-word units. These sub-word units are scored in the same manner as the words above using a language model that is based on sequences of sub-word units instead of words. The position specific posterior lattice will then contain individual sub-word units with their associated probabilities.

Upon receiving a search query, the query is decomposed into sub-word units. Documents are then ranked using the scoring techniques described above with sub-word units instead of words. In some embodiments, each word in the query can be treated as being contained in quotations to reduce the number of documents that are returned.

Although the present invention has been described with reference to particular embodiments, workers skilled in the art will recognize that changes may be made in form and detail without departing from the spirit and scope of the invention.

What is claimed is:

1. A method of indexing a speech segment, the method comprising:
    identifying a lattice of speech unit sequences by performing speech recognition on the speech segment, the lattice comprising states with transitions between states, each transition representing a speech unit and all transitions into a state representing the same speech unit;
    for each transition into each state, determining all possible speech unit positions that the speech unit for the transition occupies in all speech unit sequences that pass through the transition;
    for each state in the lattice, defining at least one sub-state with a separate sub-state for each different speech unit position determined from all of the transitions into the state such that sub-states for two different states represent a same speech unit at a same speech unit position;
    calculating a position score for each sub-state;
    summing the position scores of sub-states for different states, where the sub-states represent the same speech unit at the same speech unit position, to form a posterior probability for the speech unit in the speech unit position;
    for each speech unit in the lattice of speech unit sequences, placing information in an entry in the index that indicates a speech unit position of the speech unit in at least one speech unit sequence and the posterior probability of the speech unit in the speech unit position.

2. The method of claim 1 wherein determining a position score for a sub-state comprises determining the probability of reaching the sub-state from the beginning of the lattice and determining the probability of reaching the end of the lattice from the sub-state.

3. The method of claim 1 further comprising placing separate information in an entry for a speech unit to indicate a plurality of positions in the at least two alternative speech unit sequences where the speech unit appears.

4. The method of claim 1 wherein the speech unit comprises a word.

5. The method of claim 1 wherein the speech unit comprises a sub-word.

6. A computer storage medium having computer-executable instructions for performing steps comprising:
    receiving a search query;
    searching an index for an entry associated with a word in the search query;
    for each of a plurality of speech signals, retrieving from the entry an identifier for the speech signal, an identifier for a segment of the speech signal, a position for the word within the segment, and a probability of the word appearing at the position within the segment given the speech signal;
    using the probabilities to rank the speech signals relative to each other to form ranked speech signals by forming a weighted sum for each speech signal as:

$$S(D, Q) = \sum_{N=1}^{K} w_N \cdot S_{N-gram}(D, Q)$$

where D is the identifier for the speech signal, Q is the search query, $W_N$ is the weight associated with a particular N-gram, K is the number of words in the search query and $S_{N-gram}(D, Q)$ is computed as:

$$S_{N-gram}(D, Q) = \sum_{i=1}^{K-N+1} S(D, q_i \ldots q_{i+N-1})$$

where N is the number of words in a particular n-gram, and $S(D, q_i \ldots q_{i+N-1})$ is the score for a single n-gram beginning at point i in the query, which is calculated as:

$$S(D, q_i \ldots q_{i+N-1}) = \log\left[1 + \sum_{s}\sum_{k}\prod_{l=0}^{N-1} P(w_{k+l}(s) = q_{i+l} \mid D)\right]$$

where the inner summation on the right-hand side is performed over the first k–N word positions in a segment, the outer summation is performed across all segments associated with speech signal D, and $P(W_{k+1}(s)=q_{i+1}|D)$ is the posterior probability stored in the index for the query word $q_{i+1}$ appearing at position k+1 within segment s given speech signal D; and returning search results based on the ranked speech signals.

7. A method of searching for speech segments, the method comprising:

accessing an index containing probabilities of positions for words generated from a plurality of speech recognition lattices, each lattice being generated from a separate speech segment and each lattice representing a plurality of word sequences;

retrieving a set of probabilities of positions for a word from the index a probability of a position for a word represents a sum of probabilities of the position for the word determined at multiple states in the lattice;

and returning identifiers for speech segments that contain the word based on the set of probabilities.

8. The method of claim 7 further comprising retrieving a set of probabilities for each word of a multi-word query and using the sets of probabilities to determine a multi-word n-gram score.

* * * * *